Nov. 22, 1960

M. R. SIMMONDS 2,960,882

PRESSURE OPERATED CONTROLLER

Filed March 14, 1957

INVENTOR.
Milo R. Simmonds
BY
Popp and Sommer
ATTORNEYS.

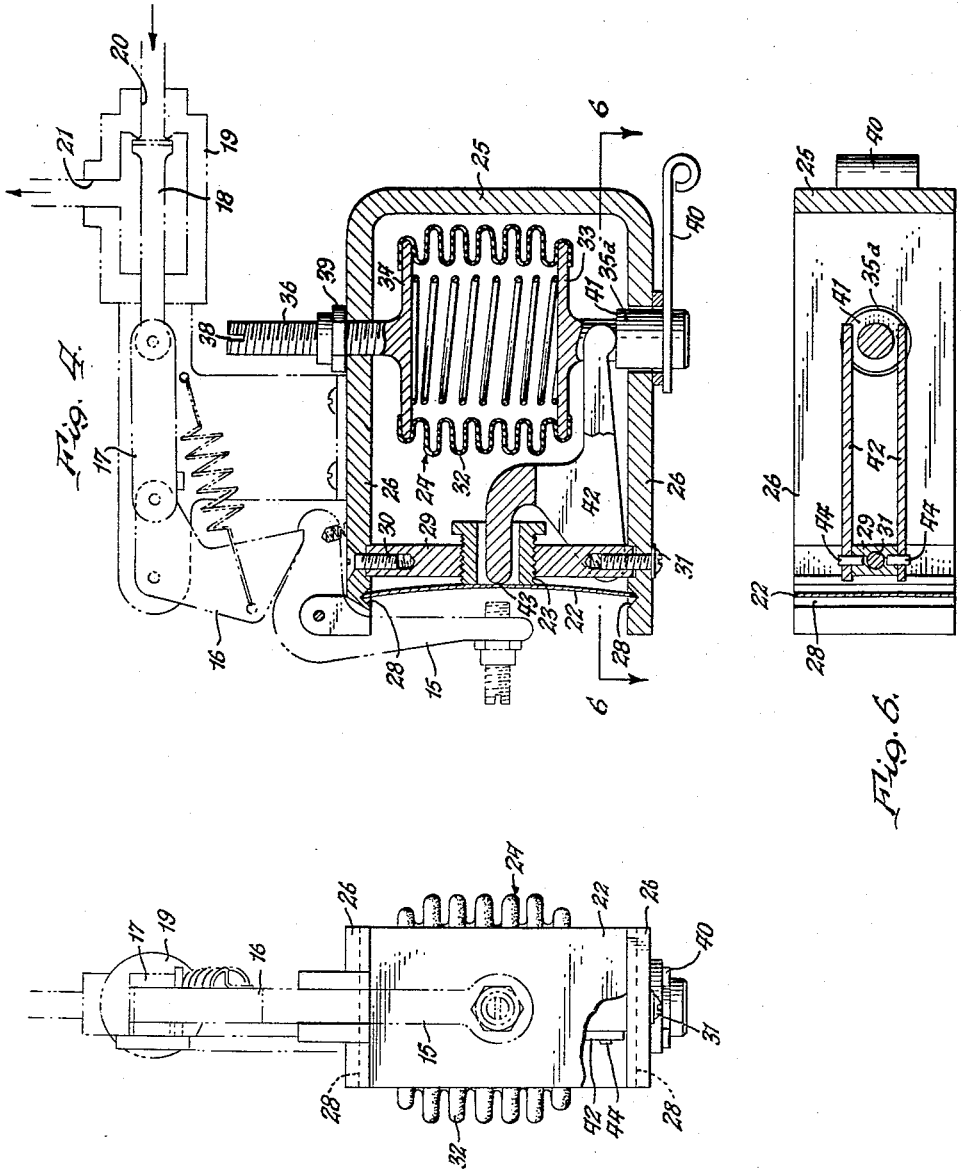

Nov. 22, 1960
M. R. SIMMONDS
2,960,882
PRESSURE OPERATED CONTROLLER
Filed March 14, 1957
4 Sheets-Sheet 3
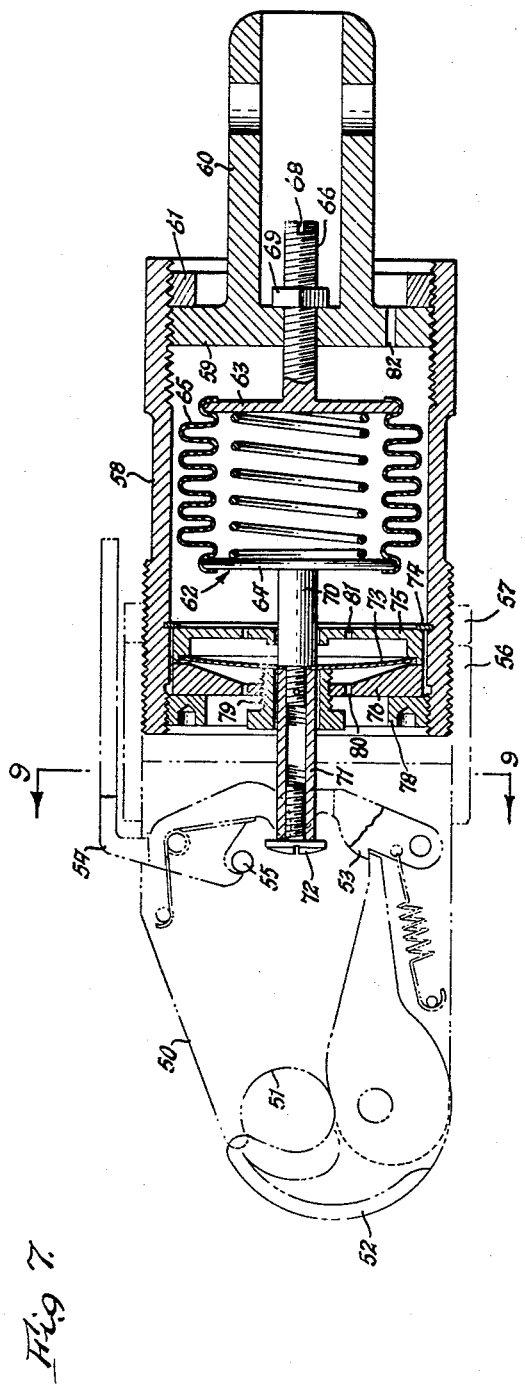
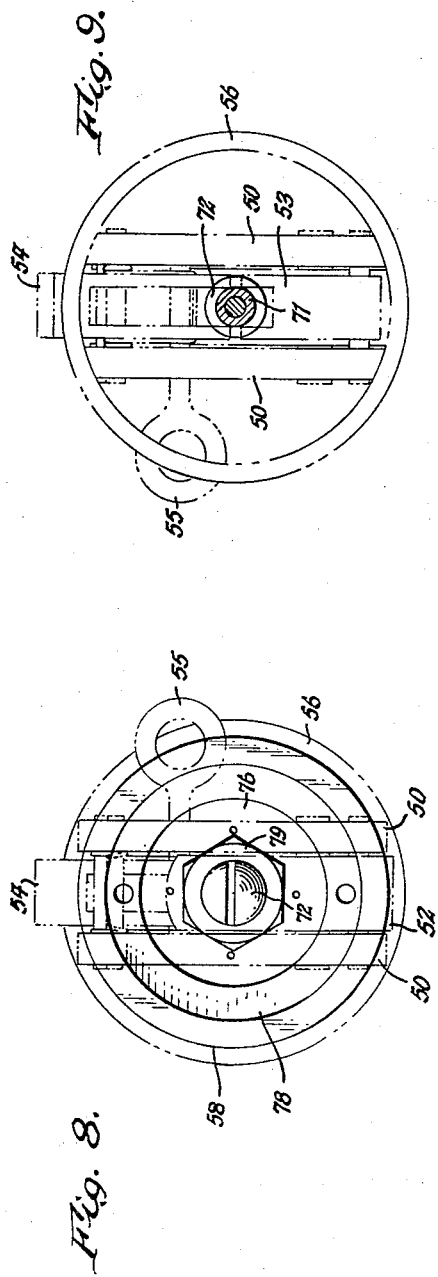
INVENTOR.
Milo R. Simmonds
BY
Popp and Sommer
ATTORNEYS.

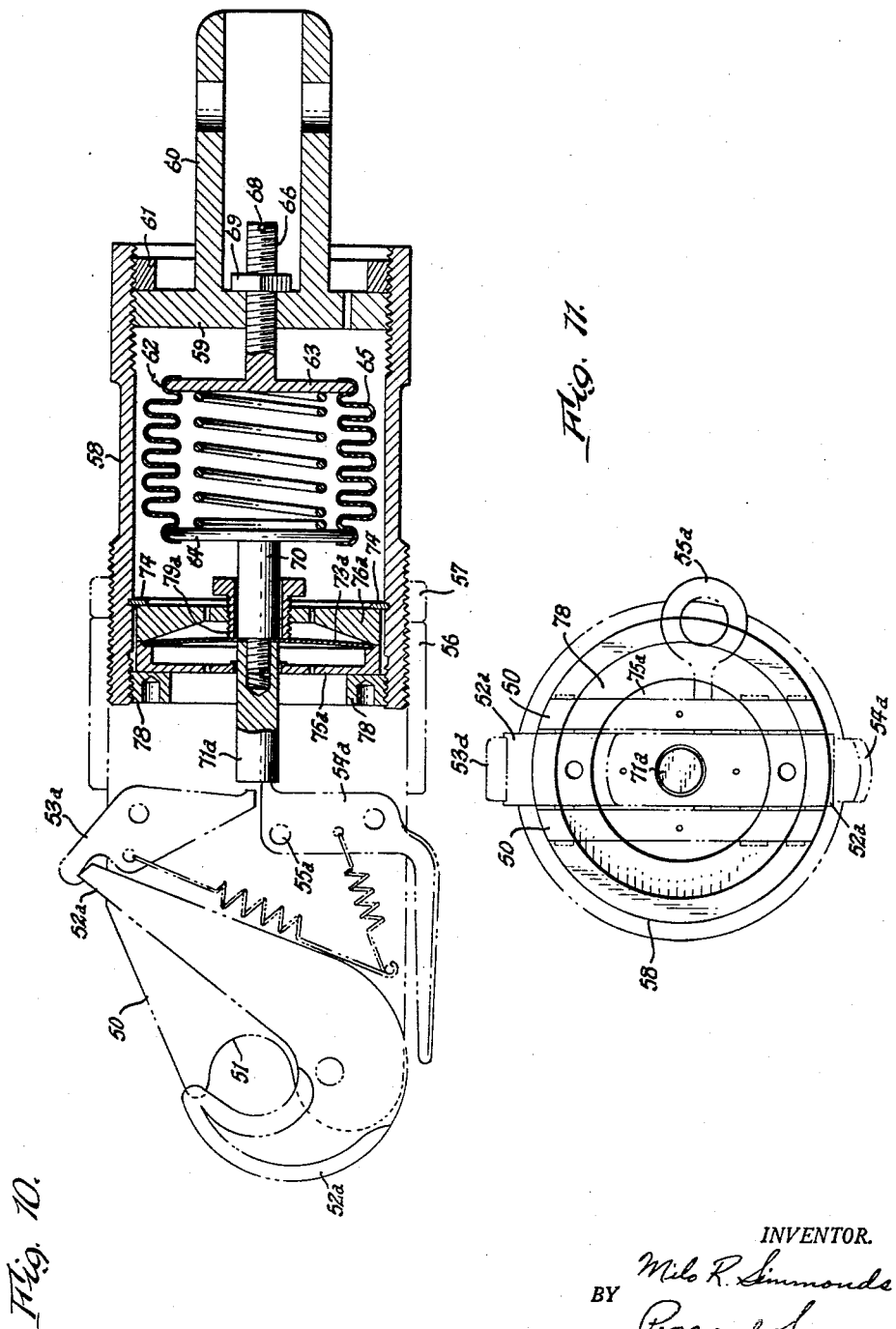

United States Patent Office 2,960,882
Patented Nov. 22, 1960

2,960,882

PRESSURE OPERATED CONTROLLER

Milo R. Simmonds, Williamsville, N.Y., assignor to Edward H. Replogle, Snyder, N.Y.

Filed Mar. 14, 1957, Ser. No. 646,154

9 Claims. (Cl. 74—109)

This invention relates to a pressure operated controller which may be used to provide mechanical actuation of other apparatus as a predetermined pressure is first experienced.

The pressure to which this controller is sensitive and by which it is actuated may be derived from any suitable source. For example, the pressure may be applied to the controller directly as in the case of barometric or altitude pressure, or may be conducted to the controller through fluid from Pitot head or venturi velocity measuring devices, volatile liquid temperature bulbs, or other instrument measuring devices which convert their indication to a pressure. Hence, this controller may be rendered responsive to a predetermined temperature, aerodynamic measurement, or other measurable phenomenon convertible to a related pressure.

The problem of providing a successful pressure sensitive controller to operate mechanical devices has been difficult, in the past, because often the pressure differential to be sensed is very small and the force or work required to actuate the mechanical device is appreciably larger. In order to remedy this disparity, often an auxiliary power system is used. For instance in an altitude sensitive control, it has been proposed to employ a very sensitive and flexible aneroid bellows to operate a low friction type of electrical switch which in turn electrically energizes a solenoid to perform the desired mechanical actuation. However this calls for external power which may not otherwise be required or available.

In an attempt to provide a completely self energizing control, techniques have been suggested which require the delicate pressure sensitive bellows to operate a sear through an extremely high mechanical advantage linkage and which releases a large spring load to effect the required mechanical actuation. Since the bellows has such a high mechanical advantage, it must move a considerable distance while releasing the sear. This might be called a position sensitive control which often has two common shortcomings. First, since the aneroid must move under a very light propelling load, it is very susceptible to hindrances and resulting inaccuracy of operation because of frictional variances. Also, because the sear is gradually withdrawn from the loaded member as the bellows is displaced, it is possible that the sear may be left in a partially released attitude as a result of the aneroid and pressure almost, but not quite, arriving at the predetermined release condition and then returning to the normal inoperative condition. As a result of these circumstances, such controls sometimes release accidentally especially when subject to vibration.

In some two way pressure and temperature controls, especially as used in the electrical industry, unstable mechanical elements such as dished diaphragms or reeds are used in conjunction with the pressure sensitive element in order to make it snap smartly from one position to the other. This relieves some of the frictional and partial operation problems but has the disadvantage that all the energy supplied as output must be produced by the pressure sensitive element. In order for a bellows to produce a large increment of energy as a result of a small pressure change, it must be large in effective area and be able to move a considerable distance as a result of this pressure change. This calls for a relatively large and bulky aneroid which would be impractical for use in some of the envisioned aircraft applications, for instance, where space and weight are at a premium.

Since a control of this nature is often required to actuate emergency apparatus, the controller of the present invention is limited in its required operation to a single automatic actuation after which it may be recocked by an application of external force and energy. Under these circumstances, considerable input energy is supplied to the controller during the resetting operation, which energy may be stored in the controller until it is returned as output when the device is triggered. Also, in accordance with the invention the controller is biased toward easy release so that a very delicate and consequently sensitive aneroid or equivalent element can release the stored energy.

It is, therefore, an object of my invention to provide a pressure operated unidirectional controller to release actuating energy at a predetermined pressure.

A further object is to provide such a controller which can automatically make available a supply of energy which is considerably higher than that producible by the pressure sensitive element of the controller.

Another object is to provide such a controller which can never be partially operated.

Another object is to provide such a device which is operated in such a way that its actuation is dependent upon the force developed by the pressure sensitive element rather than the motion produced by it, so as to minimize the effects of friction.

Another object is to provide such a controller so arranged that the energy produced by the pressure sensitive element shall be additively released with that stored by the cocked element of the controller.

Another object is to provide such a controller which is adapted for reuse, effected by the simple expedient of recocking the same after each use.

Another object is to provide such a controller which is unlikely to get out of order or require repair and which can be stored in a cocked condition for an extended period of time with assurance that it will operate as intended when put into use.

Another object is to provide such a controller which can be adjustably preset so as to be operative at the desired pressure.

Another object is to provide such a controller which is simple in construction and easy to manufacture and hence inexpensive.

Other objects and advantages of the present invention will be apparent from the following description and accompanying drawings in which:

Fig. 4 is a view similar to Fig. 1 but showing the controller modified and arranged to operate upon descent.

Fig. 5 is an end view thereof, viewed from the left of Fig. 4.

Fig. 6 is a horizontal sectional view thereof, taken on line 6—6, Fig. 4.

Fig. 7 is a central vertical longitudinal section through another form of controller embodying the present invention and showing the same in a cocked position and associated with a releasable hook to be actuated thereby when a predetermined altitude is reached upon descent.

Fig. 8 is an end view thereof, viewed from the left of Fig. 7.

Fig. 9 is a vertical transverse sectional view thereof, taken on line 9—9, Fig. 7.

Fig. 10 is a view similar to Fig. 7 but showing the controller and hook modified and arranged to operate upon ascent.

Fig. 11 is an end view thereof, taken from the left of Fig. 10.

Figure 1:
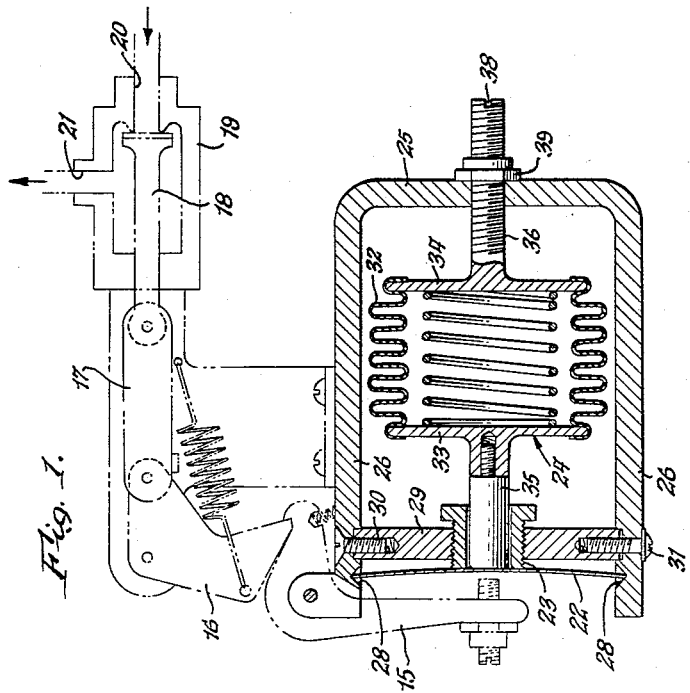
Fig. 1 is a central vertical longitudinal section through one form of controller embodying the present invention which might be incorporated in a craft, such as an aeroplane or missile, and showing the controller in a cocked position and associated with a fluid supply system to be actuated thereby when a predetermined altitude is reached upon ascent.
Figure 2:
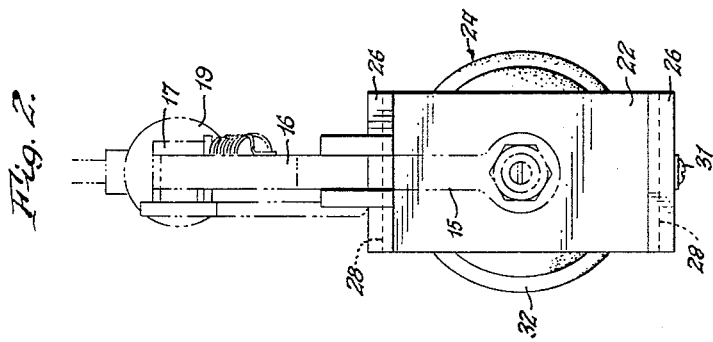
Fig. 2 is an end view thereof, viewed from the left of Fig. 1.
Figure 3:
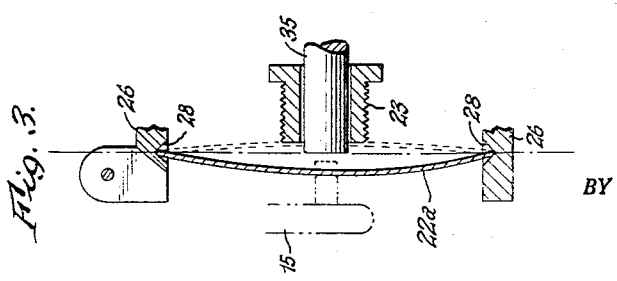
Fig. 3 is a fragmentary view thereof, similar to Fig. 1 but on a slightly enlarged scale, and showing the over-center spring member in its energy released position.

The form of the invention illustrated in Figs. 1–3 is shown as associated with a fluid supply system including a spring-loaded sear lever 15, a spring-loaded toggle linkage comprising a bell-crank lever 16 and link 17, a valve 18 arranged in a cylinder 19 having an inlet 20, closed by the valve, and an outlet 21 for fluid whose flow is to be restricted by the controller of the present invention until a predetermined altitude is reached upon ascent of the craft (not shown) which carries such apparatus. The sear lever 15 is arranged as shown, through engagement with the bell-crank lever 16, to maintain the toggle linkage referred to in a position to keep the valve 18 against the inlet seat. The sear lever 15 is a movable member adapted to be struck by the controller of the present invention when a predetermined altitude is reached, and thereby open the valve 18.

Referring now to such controller, the same is shown as comprising an overcenter toggle device 22 arranged in a cocked energy storing position to one side of center and movable to an energy released position 22a (Fig. 3) on the other side of center with a snap action and when moving past center toward the position 22a being adapted to apply an impact force to the movable sear lever 15, a stop 23 against which said toggle device is biased when in said cocked position, and pressure sensitive means, preferably a bellows assembly indicated generally at 24, arranged to move the toggle device 22 away from the stop 23 toward the energy released position 22a.

The various members are shown as arranged on an U-shaped frame member 25 having spaced upper and lower horizontal legs 26, 26, the inner and opposing faces of which near the free ends of the legs are provided with V-notches 28, 28. The overcenter toggle device 22 is preferably a thin sheet spring member shown in Figs. 1–3 specifically as a spring strip. The ends of this spring strip 22 are received or seated in the notches 28 and this strip has a length from end to end when flat which is greater than the spacing between the bases of the notches 28. Thus the spring strip 22 is capable of assuming the bowed position shown in Fig. 1 and by broken lines in Fig. 3 and also the position 22a shown by full lines in Fig. 3.

Referring to Fig. 1, the bowed spring strip 22 engages or bears against the end of the stop 23 which is shown as being in the form of a tubular sleeve externally threaded so as to be adjustably mounted in a threaded central hole in a transverse member 29 extending between the legs 26. The upper end of the transverse member 29 is shown as secured to the upper leg 26 by a screw 30 while the lower end of this member is slidably received in a recess provided in the lower leg 26. A screw 31 passing upwardly through the lower leg 26 and into a threaded hole in the lower portion of the transverse member 29, permits the spacing between the upper and lower legs to be varied and thus the loading on the spring strip 22. In other words, by turning the screw 31 so as to draw the legs 26 toward each other, the spring strip 22 tends to assume more of a bowed condition and is biased to a greater extent against the stop 23 thereby storing more energy when in this cocked position.

The bellows assembly 24 includes a closed bellow 32 of any suitable type, such as a Sylphon bellows, having opposite end walls 33, 34 movable toward and away from each other due to a pressure differential on the inside and outside of the bellows. The end wall 33 is shown as carrying an axially projecting central neck member 35 slidably arranged in the bore of the tubular stop 23. The outer end of the neck member 35 is adapted to engage the spring strip 22 and push or drive the same away from the stop 23. The other end wall 34 of the bellows is shown as provided with an axially projecting central stem 36 which is externally threaded and screwed into an internally threaded hole provided centrally in the cross bar of the frame member 25. The outer end of this stem is shown as provided with a screwdriver slot 38 for facilitating turning the same and a lock nut 39 is arranged on this stem and bears against the frame for maintaining the bellows end wall 34 in the desired axially adjusted position.

If the position of the bellows assembly 24 is adjusted on the frame 25 in the manner just described so that the fixed bellows end wall 34 is closer to the stop 23, it will be seen that the movable bellows end wall 33 will require less travel, effected by expansion of the bellows, before engaging the spring strip 22 and hence the control device will be actuated at a lower altitude, than if the end wall 34 is adjusted farther away from the stop 23. In this manner the controller can be adjusted for operation at different predetermined altitudes.

Assuming the parts to be in the position shown in Fig. 1, as the craft (not shown) increases altitude in flight, the atmospheric pressure surrounding the bellows 32 decreases while the pressure therewithin increases relatively. This pressure differential tends to cause the end walls 33 and 34 to spread. Inasmuch as the end wall 34 is fixed, the end wall 33 can move toward the stop 23. The neck member 35 attached to this movable end wall 33 moves to engage, if it has not always engaged, the salient part of the bowed and cocked spring strip 22. When the force exerted by the expanding bellows increases to a point where it overcomes that exerted by the overcenter spring strip 22 to maintain itself seated on the stop 23, the spring strip will be pushed toward center and when moved therepast the spring strip will snap toward the energy released position 22a shown in Fig. 3.

When the spring strip 22 is in the bowed and cocked position to the right of the centerline of the spring strip, i.e. the imaginery straight line connecting the ends of the spring strip, as shown in Fig. 1, it is in an unstable condition. Relatively little force is required to move the spring strip off the stop 23 when in this position, as compared to the external force and energy previously required to cock the spring strip by moving it from the released position 22a shown in Fig. 3 to the cocked position in Fig. 1. When the thrust force of the bellows 32 has increased to a sufficient level to displace the spring strip toward dead center, the spring strip will unhesitantly snap through its travel to the energy released position 22a at the instant the bias of the spring strip against the stop 23 is overbalanced, if the various parts are proportioned in the preferred manner. The thrust of the bellows 32, which diminishes in inverse proportion to its extension, will add to the output load of the spring strip 22 which progressively rises as it leaves dead center and moves toward the energy released position 22a. In other words, the bellows output is additive to that of the spring strip so that the cumulative output is much more constant in relation to the extent of spring displacement from dead center than the output of the spring strip alone.

It will be noted that the end of the sear lever 15 opposing the spring strip 22 is spaced slightly, and adjustably so, to the left of the centerline of the spring strip so that the spring strip can develop a force applied with impact to the sear lever 15. This force created by the release of energy stored within the spring strip 22 is sufficient to move the sear lever 15 enough to disengage it and the bell-crank lever 16. The toggle members 16 and 17 collapse under the urging of the toggle spring shown and this operates to retract and open the valve 18.

In order to recock the spring strip, it is merely necessary to push it again from the full line position shown in Fig. 3 to the position shown in Fig. 1. This may be accomplished by manipulating the sear lever 15. It is to be noted that it requires work to recock the spring strip 22 and this energy is stored within the strip for release during the next operation of the controller.

The controller illustrated in Figs. 4–6 is similar except that it is operative upon descent rather than ascent. Only minor modifications are required to effect this change. As shown in Figs. 4–6, the bellows assembly 24 is now arranged so that its threaded adjusting stem 36 is mounted on the upper leg 26 of the frame 25, and a modified form of neck member 35a is substituted. This neck member 35a is shown as an enlarged head which projects through an opening in the lower leg 26 and adapted to be held against retraction by an arming pin 40. The upper and inner end face of this head 35a provides a shoulder 41 engaged by one end of a bell-crank lever 42. The other end of this bell-crank lever 42 is formed with a projecting part 43 which is arranged within the bore of the tubular stop 23. Intermediate its ends the bell-crank lever 42 is suitably pivotally mounted on the frame. As shown the lower leg of this lever is bifurcated and embraces the transverse member 29 and is pivotally mounted thereon by the pivot pins 44, 44 Fig. 6.

In use, the controller shown in Figs. 4–6 is kept with the arming pin 40 in position until above the critical altitude. When above such altitude, the pin 40 can be removed so as to arm the controller. As the controller descends, atmospheric pressure increases so as to contract the bellows 32. As the lower movable bellows end wall 33 moves upwardly toward the upper fixed bellows end wall 34, the head 35a is raised so as to swing the bell-crank lever 42 about its pivot in a counterclockwise direction as viewed in Fig. 4. The projecting part 43 will engage and displace the overcenter spring strip 22 in the same manner as previously described for the push neck 35 in the form of the invention shown in Figs. 1–3.

The form of the invention illustrated in Figs. 7–9 is shown as associated with a releasable hook mechanism including a pair of transversely spaced plates 50, 50, each having a recess 51 adapted to be closed by a pivoted hook member 52 arranged between the plates 50. This hook member 52 is shown as having a tail part adapted to be engaged by a spring loaded sear lever 53, also arranged between the plates 50. Also arranged between these plates is a spring loaded pivotally mounted cocking lever 54 adapted to be held in an inoperative position by an arming pin 55 which extends transversely of the plates 50 through registered holes provided therein. The sear lever 53 is arranged through engagement with the hook member 52, to maintain the eye jointly provided by the curved outer end of this hook member and the recesses 51 in the plates 50, in a closed condition as shown in Fig. 7. However, the sear lever 53 is a movable member adapted to be struck by the altitude operated controller when a predetermined altitude is reached upon descent of the craft (not shown) which carries such apparatus so as to release the movable hook member 52 and permit the same to swing about this pivot in a counterclockwise direction as viewed in Fig. 7 to open the eye of the hook and release whatever instrumentality is carried thereby, such as a parachute.

Referring now to the form of controller illustrated in Figs. 7–9, the same is shown as comprising a tubular frame member 58 externally threaded at one end to receive the internally threaded end portion of a coupling sleeve 56 secured as by welding to the plates 50. A locking nut 57 is shown as arranged against the end of the coupling sleeve 56 for locking the same in any desired axially adjusted position on the tubular frame member 58. The opposite end of the tubular frame member 58 is shown as threadedly receiving the head 59 of an end fitting 60. A lock nut 61 working on the same threads of the tubular frame member 58 maintains the head 59 in the desired axially adjusted position.

The bellows assembly is indicated generally at 62 and comprises a fixed end wall 63 and a movable end wall 64 joined by a corrugated bellows member 65. The fixed end wall 63 is shown as being provided with an axially extending externally threaded stem 66 which is screwed into an internally threaded central hole in the head 59 of the end fitting 60. For adjustment, the outer end of the stem 66 is shown as provided with a screwdriver slot 68. A lock nut 69 working on the threads of the stem 66 and bearing against the outer face of the head 59, maintains the stem 66 in the desired axially adjusted position. The other movable end wall 64 has an outwardly and axially extending central cylindrical neck 70. The outer end of this neck 70 is reduced in diameter and externally threaded to screw into the threaded bore of a tubular extension member 71. A head is provided on the outer end of this extension member 71 by the head of a screw 72 which is screwed into the outer portion of the threaded bore of this member.

An overcenter spring member 73, in the form of a dished disc of thin sheet material has a central opening through which the reduced threaded outer end portion of the neck member 70 extends and the inner end of the sleeve member 71 clamps the spring disc 73 against the shoulder formed on the neck member 70. In other words, the spring disc 73 is clamped at its center between the neck and sleeve member 70—71 and is compelled to move with the movable end wall 64.

Means are provided for peripherally mounting the spring disc 73 on the tubular frame member 58. As shown, such means comprise a split stop ring 74 arranged partially in an internal annular groove provided in the frame member 58. Against this stop ring 74 is seated a retainer 75 provided with a lateral and outwardly extending annular flange formed adjacent its outer end with an annular recess to provide a seat for the periphery of the spring disc 73. Centrally the retainer 75 has an opening through which the neck 70 extends. A clamping washer 76 bears against the outer end of the flange of the disc retainer 75 and is held in such position by a lock ring 78 which is externally threaded so as to be screwed onto the internal threads provided on the adjacent end of the tubular frame member 58.

The spring disc 73 is adapted to bear against the end of a tubular stop member 79 through the bore of which the neck extension member 71 extends. The tubular stop 79 is externally threaded and is adjustably mounted in an internally threaded central hole provided in the clamping washer 76. This washer 76 is shown as provided with a series of axial through holes 80. Similar holes 81 are provided in the disc retainer 75. These holes 80 and 81 permit atmospheric pressure to communicate with opposite sides of the spring disc 73. Atmospheric pressure is also permitted access to the exterior of the bellows assembly 62 through the vent hole 82 provided in the head 59 of the end fitting 60.

In use, the controller shown in Figs. 7–9 is kept with the arming pin 55 in position until above the critical altitude. When above such altitude, the pin 55 can be removed so as to arm the controller. As the device descends, atmospheric pressure increases so as to tend to contract the bellows 65. As the movable bellows end wall 64 tends to move toward the fixed bellows end wall 63, the neck and extension member 70 and 71, respectively, tend to be retracted so as to unseat the salient central part of the spring disc 73 from the stop 79. When the force developed by the bellows assembly 62 due to a pressure differential on the inside and outside of the bellows reaches a level sufficient to unseat or drive the spring disc 73 past center, such spring disc will move to an energy released position on the right side of center with a snap action. Inasmuch as there is a spacing between the head 72 on the neck extension member 71 and the free end of the sear lever 53, the spring disc 73 is allowed to develop and apply an impact force to the sear lever 53 sufficient to disengage the same from the pivoted hook member 52. Whatever instrumentality is held within the closed eye of the hook will thereby be released at a predetermined altitude at which the controller is set to operate in the manner just described.

In order to recock the controller shown in Figs. 7–9, the handle portion of the cocking lever 54 is moved toward the tubular frame member 58 and the arming pin 55 can be re-inserted to restore the position of the various parts, including the spring disc 73, to that shown in Fig. 7.

The controller illustrated in Figs. 10 and 11 is similar to that shown in Figs. 7–9 except that in Figs. 10 and 11 the device has been modified to render it operative upon ascent rather than descent. In the form illustrated in Figs. 10 and 11 the tail portion of the hook member 52a extends upwardly and the spring loaded sear lever 53 has a different configuration and placement. Likewise the cocking lever 54a is somewhat modified and the arming pin is indicated at 55a.

The spring disc 73a and associated disc retainer 75a, clamping washer 76a and the stop 79a carried thereby, are reversed between the stop ring 74 and the lock ring 78, as compared to the arrangement shown in Figs. 7–9. The bellows assembly 62 shown in Figs. 10 and 11 is similar to that shown in Figs. 7–9, except that the neck extension member 71 has been modified as indicated at 71a in Fig. 10 to provide a part movable with the end wall 64 of the bellows and adapted to strike the opposing and spaced free end of the sear lever 53a.

In the use of the form of controller and associated hook mechanism illustrated in Figs. 10 and 11, it will be seen that after the controller has been armed by removal of the arming pin 55a, ascent through the atmosphere will effect the expansion of the bellows 65 so as to drive the neck 70 and its extension 71a outwardly. This will cause the bowed or dished spring disc 73a to unseat from the stop 79a toward which it is biased to a point where it will snap into an energy released position to the left of center thereby generating a force which is applied with impact to the sear lever 53a which is thereupon moved to release the pivoted hook member 52a.

To recock the spring disc 73a, the cocking lever 54a is manipulated in a clockwise direction about its pivot so as to push the spring disc 73a through engagement with the neck extension 71a again against the stop 79a.

From the foregoing, it will be seen that the various forms of the present invention accomplish the objects stated. It is to be particularly noted that the overcenter spring member, being the preferred form of the overcenter toggle device, can take various forms such as the spring strip 22 as shown in Figs. 1–6, or the dished spring disc 73 or 73a shown in Figs. 7–11. Other modifications of the invention will readily occur to those skilled in the art without departing from the spirit of the invention which is not intended to be limited to the specific forms illustrated nor the specific apparatus with which they are shown associated but rather measured by the scope of the appended claims.

I claim:

1. A pressure operated unidirectional controller for striking a movable member, said controller comprising an overcenter toggle device arranged in a cocked energy storing position to one side of center and movable to an energy released position on the other side of center with a snap action and when moving past center toward said released position being adapted to apply an impact force to said first mentioned member, a stop against which said toggle device is biased when in said cocked position, and pressure sensitive means movable relative to said stop and arranged to move said toggle device away from said stop toward said released position, said toggle device when moving from said cocked position to said released position releasing energy in excess of that supplied to it by the actuation of said pressure sensitive means.

2. A controller as set forth in claim 1 in which said toggle device is a spring member.

3. A pressure operated unidirectional controller for striking a movable member, said controller comprising a frame having spaced portions, an overcenter spring member extending between said frame portions and having a dimension normally greater than the spacing between said frame portions, said spring member being bowed in a cocked energy storing position to one side of center and movable to an energy released position on the other side of center with a snap action and when moving past center toward said released position being adapted to apply an impact force to said first mentioned member, a stop on said frame and against which said spring member is biased when in said cocked position, and pressure sensitive means movable relative to said stop and arranged on said frame to move said spring member away from said stop toward said released position, said spring member when moving from said cocked position to said released position releasing energy in excess of that supplied to it by the actuation of said pressure sensitive means.

4. A pressure operated unidirectional controller for striking a movable member, said controller comprising a frame having spaced opposing and relatively movable portions, an overcenter spring strip having its opposite ends seated on said frame portions and having a length normally greater than the spacing between said frame portions, said spring strip being bowed in a cocked energy storing position to one side of center and movable to an energy released position on the other side of center with a snap action and when moving past center toward said released position being adapted to apply an impact force to said first mentioned member, a stop on said frame and against which said spring strip is biased when in said cocked position, pressure sensitive means movable relative to said stop and arranged on said frame to move said spring strip away from said stop toward said released position, said spring strip when moving from said cocked position to said released position releasing energy in excess of that supplied to it by the actuation of said pressure sensitive means, and means for adjusting the spacing between said frame portions thereby to vary the loading on said spring strip when in said cocked position.

5. A pressure operated unidirectional controller for striking a movable member, said controller comprising a frame having spaced opposing portions movable toward and away from each other, means for adjusting the spacing between said frame portions and including a transverse member, an overcenter spring strip arranged adjacent said transverse member and having its opposite ends seated on said frame portions and having a length normally greater than the spacing between said frame portions, said spring strip being bowed in a cocked energy storing position to one side of center and toward said transverse member and movable to an energy released position on the other side of center with a snap action and when moving past center toward said released position being adapted to apply an impact force to said first mentioned member, a stop on said transverse member and against which said spring strip is biased when in said cocked position, and pressure sensitive means movable relative to said stop and arranged on said frame to move said spring strip away from said stop toward said released position, said spring strip when moving from said cocked position to said released position releasing energy in excess of that supplied to it by the actuation of said pressure sensitive means.

6. A pressure operated unidirectional controller for striking a movable member, said controller comprising a frame having a transverse member, an overcenter spring member seated on said frame adjacent said transverse member and being bowed in a cocked energy storing position to one side of center and toward said transverse member and movable to an energy released position on the other side of center with a snap action and when moving past center toward said released position being adapted to apply an impact force to said first mentioned member, a stop adjustably mounted on said transverse member and against which said spring member is biased when in said cocked position, and pressure sensitive means mounted on said frame and including a displace member movable relative to said stop and arranged to engage said spring member and move the same away from said stop toward said released position, said spring member when moving from said cocked position to said released position releasing energy in excess of that supplied to it by the actuation of said pressure sensitive means.

7. A controller as set forth in claim 6 in which said stop is a tubular member having a threaded engagement with said transverse member, and said displace member is arranged in the bore of said stop.

8. A pressure operated unidirectional controller for striking a movable member, said controller comprising a frame, an overcenter spring disc mounted peripherally on said frame and being dished in a cocked energy storing position to one side of center and movable to an energy released position on the other side of center with a snap action and when moving past center toward said released position being adapted to apply an impact force to said first mentioned member, a stop on said frame and against which said spring disc is biased when in said cocked position, and pressure sensitive means movable relative to said stop and arranged on said frame to move said spring disc away from said stop toward said released position, said spring disc when moving from said cocked position to said released position releasing energy in excess of that supplied to it by the actuation of said pressure sensitive means.

9. A pressure operated unidirectional controller for striking a movable member, said controller comprising a frame, an overcenter spring member mounted on said frame and being bowed in a cocked energy storing position to one side of center and movable to an energy released position on the other side of center with a snap action and when moving past center toward said released position being adapted to apply an impact force to said first mentioned member, a stop on said frame and against which said spring member is biased when in said cocked position, a bellows having opposite ends movable toward and away from each other, one of said ends being movable relative to said stop and arranged to move said spring member away from said stop toward said released position, and means adjustably mounting the other of said ends on said frame whereby the controller can be adjusted for operation at selective pressure differentials between the inside and outside of said bellows, said spring member when moving from said cocked position to said released position releasing energy in excess of that supplied to it by the actuation of said bellows.

References Cited in the file of this patent

UNITED STATES PATENTS

| | | |
|---|---|---|
| 1,523,351 | Schwimmer | Jan. 13, 1925 |
| 1,872,205 | Winger | Aug. 16, 1932 |
| 2,214,298 | Gilbert | Sept. 10, 1940 |
| 2,410,680 | Rasmussen et al. | Nov. 5, 1946 |
| 2,690,875 | Jenkins | Oct. 5, 1954 |